United States Patent
Lin et al.

(10) Patent No.: US 10,608,684 B2
(45) Date of Patent: Mar. 31, 2020

(54) METHOD FOR REMOVING SPATIAL AND TEMPORAL MULTI-PATH INTERFERENCE FOR A RECEIVER OF FREQUENCY-MODULATED RADIO SIGNALS

(71) Applicants: Continental Automotive France, Toulouse (FR); Continental Automotive GmbH, Hannover (DE)

(72) Inventors: Chao Lin, Maurepas (FR); Gérald Soulier, Rambouillet (FR)

(73) Assignees: Continenta Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/490,638

(22) PCT Filed: May 31, 2018

(86) PCT No.: PCT/FR2018/051249
§ 371 (c)(1),
(2) Date: Sep. 3, 2019

(87) PCT Pub. No.: WO2018/220327
PCT Pub. Date: Dec. 6, 2018

(65) Prior Publication Data
US 2020/0007179 A1   Jan. 2, 2020

(30) Foreign Application Priority Data

Jun. 1, 2017  (FR) ..................................... 17 54868

(51) Int. Cl.
*H04L 27/14*   (2006.01)
*H04B 17/336*   (2015.01)
(Continued)

(52) U.S. Cl.
CPC ........... *H04B 1/1081* (2013.01); *H04B 1/082* (2013.01); *H04B 7/0404* (2013.01);
(Continued)

(58) Field of Classification Search
CPC .... H04B 1/1036; H04B 1/1081; H04B 1/082; H04B 7/0404; H04B 7/0845;
(Continued)

(56) References Cited

U.S. PATENT DOCUMENTS

| 6,853,633 B1* | 2/2005 | Ramesh | ............... H04B 14/064 370/252 |
| 6,961,019 B1* | 11/2005 | McConnell | ............. G01S 19/21 342/357.59 |

(Continued)

OTHER PUBLICATIONS

International Search Report and Written Opinion for International Application No. PCT/FR2018/051249, dated Sep. 24, 2018, 10 pages.
(Continued)

*Primary Examiner* — Pablo N Tran
(74) *Attorney, Agent, or Firm* — RatnerPrestia

(57) ABSTRACT

A method for decreasing multi-path interference, for a vehicle radio receiver including at least two radio reception antennas that each receive a plurality of radio signals composed of time-shifted radio signals resulting from a multi-path effect. The plurality of radio signals combined to deliver a combined radio signal $y_s$ to be played, with: $y_n = W_n^T [\overline{G_{1,n}^S} X_{1,n} + \overline{G_{2,n}^S} X_{2,n}]$ at time n, where $x_1$ and $x_2$ are vectors the components of which correspond to the plurality of signals received by the first antenna and by the second antenna, respectively, $G_{1,n}^S$ and $G_{2,n}^S$ are scalars the components of which are the complex weights of a spatial filter and $w_n^T$ is the transpose matrix of a vector the components of which are the complex weights of a temporal filter. The method includes implementation of an iterative
(Continued)

adaptation algorithm to determine the complex weights of the spatial filter and the complex weights of the temporal filter.

10 Claims, 1 Drawing Sheet

(51) Int. Cl.
| | | |
|---|---|---|
| *H04B 1/10* | (2006.01) | |
| *H04B 1/08* | (2006.01) | |
| *H04B 7/08* | (2006.01) | |
| *H04L 25/03* | (2006.01) | |
| *H04B 7/0404* | (2017.01) | |

(52) U.S. Cl.
CPC ..... *H04B 7/0845* (2013.01); *H04L 25/03057* (2013.01); *H04L 2025/0363* (2013.01)

(58) Field of Classification Search
CPC ..... H04B 17/336; H04B 1/1027; H04L 27/06; H04L 41/0826; H04L 25/03057; H04L 2025/0363; H04L 27/14
See application file for complete search history.

(56) References Cited

U.S. PATENT DOCUMENTS

| | | | | |
|---|---|---|---|---|
| 7,065,162 | B1* | 6/2006 | Sorrells | H03D 7/00 375/343 |
| 7,127,217 | B2* | 10/2006 | Tuttle | H04B 1/18 455/87 |
| 7,319,846 | B2* | 1/2008 | He | H04L 1/20 455/114.2 |
| 7,899,106 | B2* | 3/2011 | Camp, Jr. | H04L 27/2647 375/134 |
| 8,218,422 | B2* | 7/2012 | Venturino | H04W 16/28 370/208 |
| 8,275,324 | B2* | 9/2012 | Wilborn | H04W 52/223 455/127.2 |
| 8,649,729 | B2* | 2/2014 | Nightingale | H04K 3/28 375/134 |
| 8,917,201 | B2* | 12/2014 | Malaga | H04B 7/18506 342/159 |
| 8,976,917 | B2* | 3/2015 | Yang | H04B 1/7115 375/147 |
| 9,246,736 | B2* | 1/2016 | Sorrells | H03C 1/62 |
| 9,407,303 | B2* | 8/2016 | Menon | H04B 7/08 |
| 9,432,152 | B2* | 8/2016 | Feher | G16H 10/60 |
| 9,712,314 | B2* | 7/2017 | Liu | H04B 1/525 |
| 9,843,938 | B2* | 12/2017 | Kang | H04W 16/28 |
| 10,069,712 | B2* | 9/2018 | Qian | H04L 43/16 |
| 2005/0031064 | A1* | 2/2005 | Kolze | H04B 1/1027 375/350 |
| 2005/0239406 | A1* | 10/2005 | Shattil | H01Q 3/26 455/63.1 |
| 2012/0134394 | A1* | 5/2012 | Allen | H04L 7/0008 375/219 |
| 2019/0140736 | A1* | 5/2019 | Egg | H04B 1/1081 |

OTHER PUBLICATIONS

Xu, B., et al., "Performance enhancement of space-time constant modulus array for smart antenna applications," Circuits and Systems, Proceedings 1998 Midwest Symposium on Notre Dame, IN, Aug. 9-12, 1998, pp. 502-505.

Gooch, R.P., et al., "Joint spatial and temporal equalization in a decision-directed adaptive antenna system," vol. 1, Oct. 31, 1988, pp. 255-259, Oct. 31, 1988; Oct. 31, 1988-Nov. 2, 1988.

* cited by examiner

METHOD FOR REMOVING SPATIAL AND TEMPORAL MULTI-PATH INTERFERENCE FOR A RECEIVER OF FREQUENCY-MODULATED RADIO SIGNALS

CROSS REFERENCE TO RELATED APPLICATIONS

This application is the U.S. National Phase Application of PCT International Application No. PCT/FR2018/051249, filed May 31, 2018, which claims priority to French Patent Application No. 1754868, filed Jun. 1, 2017, the contents of such applications being incorporated by reference herein.

FIELD OF THE INVENTION

The invention relates to the field of the reception of frequency-modulated radio signals, in particular in mobile radio receivers exposed to the effect of multi-paths, which is known to those skilled in the art.

More precisely, the present invention relates to a method for removing reflected radio waves resulting from the multi-path effect in a receiver of frequency-modulated radio signals, by means of both spatial and temporal processing of this interference.

BACKGROUND OF THE INVENTION

As is known, a radio receiver, in particular in a multimedia system of a motor vehicle, is able to receive a radio signal, in particular an FM radio signal, FM being the acronym of "frequency modulation".

Such an FM radio signal, received in modulated form by a radio receiver, is subjected to various sensors and to suitable filtering so that the corresponding demodulated radio signal is able to be played back under good conditions, in particular in the passenger compartment of a motor vehicle.

Those skilled in the art know the operating principle of an FM, that is to say frequency-modulated, radio signal received by a suitable radio receiver, with a view to being demodulated and then played to listeners.

A known problem that relates to the reception of an FM radio signal via a mobile radio receiver, in particular one incorporated into a motor vehicle, resides in the fact that the FM radio signal emitted by an emitter may be reflected by natural obstacles or buildings for example, before being received by an antenna of the radio receiver. In other words, the emitted radio signal, before being received by an antenna of the receiver, may have followed various paths, of relatively long or short length. The emitted signal may furthermore, because of masking, not be received at all by the antenna of the radio receiver.

As a result thereof a selectivity is necessary, because a given radio signal may be received by one antenna several times, with various time shifts. This problem is known to those skilled in the art, who generally refer to it as "multi-path".

In addition, to mitigate the aforementioned drawbacks relative to multi-path and masking, it is known to equip radio receivers with at least two separate antennas that are said to create "phase diversity".

Phase-diversity systems comprising two antennas are one known solution to the problem of generating frequency selectivity with a view to processing interference due to multi-path in motor-vehicle radio receivers.

The principle consists in combining the FM radio signals received by two separate antennas of a radio receiver, in order to make, virtually, the assembly formed by said two antennas directional, in order to privilege a desired radio signal reaching the antenna array at a certain angle, to the detriment of an undesired radio signal reaching the antenna network at a different angle.

To mitigate the effect of the spatial and temporal interference induced by the multi-path effect, systems for achieving channel equalization by means of a specific configuration of an impulse response filter (also referred to as an "FIR") exist, in order to equilibrate the transfer function of the channel.

In this prior art, multi-tuner receivers thus employ two types of processing, which are carried out separately, the spatial processing with "phase diversity" being carried out upstream of the temporal equalization of the channel.

Furthermore, in the prior art, algorithms for removing multi-path signals are generally of the "constant modulus" type. Specifically, the principle of frequency modulation ensures that the emitted radio signal has a constant modulus. Thus, computational algorithms called constant modulus algorithms (CMAs) have been developed and those skilled in the art are constantly seeking to improve them, with for main constraint to ensure, after computation, a substantially constant modulus of the radio signal combined within the receiver, after processing.

CMA algorithms are iterative computational algorithms the objective of which is to determine the real and imaginary parts of complex weights to be applied to the FM radio signals received by one or more antennas of a radio receiver, with a view to combining them, so as to remove from the combined radio signal the interference due to multi-path.

It is therefore a question, in the prior art, of determining the components of a spatial filtering, by means of a first implementation of a CMA algorithm, then the components of an impulse response filter, for the temporal filtering, by means of the implementation of a second CMA algorithm.

FIG. 1 shows a schematic representative of the prior art, in which two antennas A1, A2 respectively receive radio signals $X_{1,n}$, $X_{2,n}$ corresponding to an emitted FM radio signal, via respective input stages FE1, FE2. Two successive filtering stages are implemented to achieve the recombined signal $Y_n$ intended to be played. Firstly, there is a spatial filtering stage G1 and G2, respectively, then a temporal filtering stage W.

With reference to FIG. 1, a first set of equations of a system with "spatial diversity" results there from:

$$z_n = \overline{G_{1,n}^S} X_{1,n} + \overline{G_{2,n}^S} X_{2,n}$$

$$J_{CMA} = E\{(|z_n|-R)^2\}$$

where $G_{1,n}^S$, $G_{2,n}^S$ are scalars of complex weights, for the spatial filtering of the signals $X_{1,n}$, $X_{2,n}$ received by each of the antennas A1, A2; $J_{CMA}$ is the cost function to be minimized by means of a CMA algorithm and R is a constant to be determined, corresponding to the constant modulus of the combined signal.

A second set of equations of a system with "temporal diversity" results there from:

$$y_n = (\overline{W_n^t})^T Z_n$$

$$J_{CMA'} = E\{(|y_n|-R)^2\}$$

where $\overline{W_n^t}$ is a matrix of complex weights the components of which correspond to the coefficients of an impulse response filter to be applied to the signal $Z_n$ for the temporal filtering, $Z_n$ being composed of successive samples of the signal $z_n$ issued from the spatial filtering stage; $J_{CMA}$, is the cost function to be minimized by means of a CMA algorithm and R is a constant to be determined, corresponding to the constant modulus of the combined signal.

However, as the spatial filtering is performed upstream and independently, i.e. without taking into account the time dimension of the interference, problems arise. Specifically, a first iterative CMA algorithm is implemented for the spatial filtering. The fact that the time issue is not taken into account at this stage means that the implemented algorithm may at any moment hop to an adjacent radio signal. The temporal filtering performed subsequently may then have substantial difficulty converging, or even not converge.

The high number of unknowns and the absence of correlation between these unknowns makes rapid determination of stable solutions particularly difficult.

As is known to those skilled in the art, this difficulty with rapidly converging to correct and stable solutions is particularly present in the field of FM radio reception, because the only certain constraint exploitable a priori by algorithms resides in the fact that the modulus of the envelope of the frequency-modulated radio signal remains constant.

However, on the other hand, the antennas A1, A2 each receive a plurality of radio signals, corresponding to the emitted radio signal having followed various paths, which are either direct or with one or more reflections, and a complex weight must be determined with a view to being applied to each of these radio signals. The equation contains a high number of unknowns and the objective of the CMA algorithms is therefore to determine the best solutions, among a set of non-optimal solutions allowing a constant modulus of the combined radio signal to be ensured.

More particularly, in scenarios where the desired radio signals coexist with radio signals transmitted over adjacent frequency channels, this problem of convergence is more pronounced. It often occurs that the complex weights obtained with CMA algorithms privilege adjacent radio signals to the detriment of the desired radio signals. Stability problems are thus particularly frequent.

SUMMARY OF THE INVENTION

To remedy these drawbacks, an aspect of the present invention proposes, firstly, to perform a single spatial and temporal optimization after linear combination of all of the signals received by at least two antennas that are separate from one another.

A single iterative algorithm, in particular of CMA type, is thus implemented to carry out both the spatial filtering and the temporal filtering for the plurality of signals received by said at least two separate antennas.

Secondly, according to one preferred embodiment, the obtained equation is translated into polar coordinates in order to introduce a physical sense in the form of a relationship between the signals received by said at least two antennas. Advantageously, with respect to the prior art, this solution allows orthogonal solution axes to be obtained for the CMA algorithm implemented. In addition, by virtue of the correlation introduced between the variation in the various coefficients, as is demonstrated in the rest of the description, the capacity of the implemented algorithm to rapidly converge to a small number of stable solutions is moreover improved.

More precisely, one aspect of the present invention is a method for decreasing multi-path interference, for implementation thereof in a vehicle radio receiver, said radio receiver being intended to receive an emitted radio signal and comprising at least two radio reception antennas that each receive a plurality of radio signals corresponding to said emitted radio signal, each of said plurality of signals received by each of said antennas being composed of time-shifted radio signals resulting from a multi-path effect, said plurality of radio signals being combined to deliver a combined radio signal $y_n$ to be played, with $y_n = W_n^T [\overline{G_{1,n}^S}, X_{1,n} + \overline{G_{2,n}^S}, X_{2,n}]$ at the time n, where $X_1$ is a vector the components of which correspond to a plurality of signals received by a first antenna, expressed in complex baseband, $X_2$ is a vector the components of which correspond to the plurality of signals received by a second antenna, expressed in complex baseband, $G_{1,n}^S$ and $G_{2,n}^S$ are scalars the components of which are the complex weights of a spatial filter and $W_n^T$ is the transpose matrix of a vector the components of which are the complex weights of a temporal filter, said method comprising the implementation of an iterative adaptation algorithm to determine said complex weights of the spatial filter and said complex weights of the temporal filter.

By virtue of the method according to an aspect of the invention, the iterative adaptation algorithm implemented to carry out the spatial and temporal filtering of the plurality of radio signals received by said at least two antennas converge more rapidly and more stably.

Advantageously, the iterative adaptation algorithm is configured to minimize a cost function J such that $$J = E\{(|y_n| - R)^2\}$$

where R is a constant to be determined, corresponding to the constant modulus of the combined signal $y_n$.

Advantageously, said iterative adaptation algorithm is a constant modulus adaptation algorithm configured to minimize the cost function.

According to the preceding embodiment, the respective variations in the components of the matrix the components of which form the complex weights of the temporal filter and in the components of the scalars the components of which form the complex weights of a spectral filter are written:

$$W_{n+1}^t = W_n^t - \mu_W \frac{|y_n| - R}{|y_n|} \overline{y_n}(\overline{G_{1,n}^S} X_{1,n} + \overline{G_{2,n}^S} X_{2,n})$$

$$G_{1,n+1}^S = G_{1,n}^S - \mu_{G1} \frac{|y_n| - R}{|y_n|} \overline{y_n}(\overline{W_n^T})^T X_{1,n}$$

$$G_{2,n+1}^S = G_{2,n}^S - \mu_{G2} \frac{|y_n| - R}{|y_n|} \overline{y_n}(\overline{W_n^T})^T X_{2,n}$$

where $\mu_W$, $\mu_{G1}$, and $\mu_{G2}$ are iterative steps chosen for the update of the gains and phases of each of the complex weights.

In this embodiment, the high correlation that exists between the components of the spatial filter and of the temporal filter means that the iterative adaptation algorithm is more efficient.

The preceding equations are generic and may be developed in cartesian or polar coordinates. For an optimal efficiency, as is explained below, according to one preferred embodiment, the complex weights are expressed in polar coordinates.

According to this embodiment, the method according to an aspect of the invention moreover comprises introducing a correlation between said complex weights of the temporal filter and said complex weights of the spatial filter, said correlation being dependent on the time shift between said plurality of radio signals received by said at least two antennas, by means of the expression of said complex weights in polar coordinates, so that the instantaneous gradient of the cost function is written:

$$\nabla J = 2 \frac{|y_n| - R}{|y_n|} \begin{bmatrix} \text{Re}\left[\overline{y_n} e^{j\theta_n^t} \circ (\overline{G_{1,n}^s} X_{1,n} + \overline{G_{2,n}^s} X_{2,n})\right] \\ -\text{Im}\left[\overline{y_n} A_n^t \circ e^{j\theta_n^t} \circ (\overline{G_{1,n}^s} X_{1,n} + \overline{G_{2,n}^s} X_{2,n})\right] \\ \text{Re}\left[\overline{y_n} e^{j\varphi_{1,n}} (\overline{W_n^t})^T X_{1,n}\right] \\ -\text{Im}\left[\overline{y_n} b_{1,n} e^{j\varphi_{1,n}} (\overline{W_n^t})^T X_{1,n}\right] \\ \text{Re}\left[\overline{y_n} e^{j\varphi_{2,n}} (\overline{W_n^t})^T X_{2,n}\right] \\ -\text{Im}\left[\overline{y_n} b_{2,n} e^{j\varphi_{2,n}} (\overline{W_n^t})^T X_{2,n}\right] \end{bmatrix}$$

with:

$W_n^t = A_n^t \circ e^{-j\theta_n^t}$, with:

$A_n^t = [a_{0,n} a_{1,n} a_{2,n} \ldots a_{K-1,n}]^T$ $\theta_n^t = [e^{-j\theta_{0,n}} e^{-j\theta_{1,n}} e^{-j\theta_{2,n}} \ldots e^{-j\theta_{K-1,n}}]^T$, and:

$G_{1,n}^s = b_{1,n} e^{-j\varphi_{1,n}}$ $G_{2,n}^s = b_{2,n} e^{-j\varphi_{2,n}}$ so as to incorporate an interdependence between the real and imaginary parts of said complex weights.

According to the preceding embodiment, the respective variations in the components of the matrix the components of which form the complex weights of the temporal filter and in the components of the scalars the components of which form the complex weights of a spatial filter are written:

$$A_{n+1}^t = A_n^t - \mu_A \frac{|y_n| - R}{|y_n|} \text{Re}\left[\overline{y_n} e^{j\theta_n^t} \circ (\overline{G_{1,n}^s} X_{1,n} + \overline{G_{2,n}^s} X_{2,n})\right]$$

$$\theta_{n+1}^t = \theta_n^t + \mu_\theta \frac{|y_n| - R}{|y_n|} \text{Im}\left[\overline{y_n} A_n^t \circ e^{j\theta_n^t} \circ (\overline{G_{1,n}^s} X_{1,n} + \overline{G_{2,n}^s} X_{2,n})\right]$$

$$b_{1,n+1} = b_{1,n} - \mu_{b1} \frac{|y_n| - R}{|y_n|} \text{Re}\left[\overline{y_n} e^{j\varphi_{1,n}} (\overline{W_n^t})^T X_{1,n}\right]$$

$$\varphi_{1,n+1} = \varphi_{1,n} + \mu_{\varphi 1} \frac{|y_n| - R}{|y_n|} \text{Im}\left[\overline{y_n} b_{1,n} e^{j\varphi_{1,n}} (\overline{W_n^t})^T X_{1,n}\right]$$

$$b_{2,n+1} = b_{2,n} - \mu_{b2} \frac{|y_n| - R}{|y_n|} \text{Re}\left[\overline{y_n} e^{j\varphi_{2,n}} (\overline{W_n^t})^T X_{2,n}\right]$$

$$\varphi_{2,n+1} = \varphi_{2,n} + \mu_{\varphi 2} \frac{|y_n| - R}{|y_n|} \text{Im}\left[\overline{y_n} b_{2,n} e^{j\varphi_{2,n}} (\overline{W_n^t})^T X_{2,n}\right]$$

where $\mu_A$, $\mu_\theta$, $\mu_{b1}$, $\mu_{b2}$, $\mu_{\varphi 1}$, $\mu_{\varphi 2}$ are iterative steps chosen for the update of the gains and phases of each of the complex weights, and the operator "∘" is defined as carrying out the multiplication of two vectors, component by component, the resultant being a vector.

In this embodiment, the very high correlation that exists between the components of the spatial filter and of the temporal filter means that the iterative adaptation algorithm is more efficient.

Advantageously, the temporal filter is an impulse response filter.

An aspect of the present invention also relates to a radio receiver comprising a microcontroller configured to implement the method such as briefly described above.

An aspect of the present invention also relates to a motor vehicle comprising a radio receiver such as briefly described above.

BRIEF DESCRIPTION OF THE DRAWINGS

An aspect of the invention will be better understood on reading the following description, which is given solely by way of example, with reference to the appended drawing, in which.

DETAILED DESCRIPTION OF THE PREFERRED EMBODIMENTS

The method for adapting an FM radio signal according to an aspect of the invention is presented with a view to an implementation, principally, in a radio receiver of a multimedia system on board a motor vehicle. However, an aspect of the present invention may also be implemented in any other technical field, and in particular in any type of FM radio receiver.

An aspect of the present invention proposes to introduce an adaptive spatial and temporal model, in order to take into account both the spatial correlation and the temporal correlation that exists, from the physical point of view, between the multi-path FM radio signals received by a plurality of antennas of the radio receiver in question.

It is known, in another technical field relative to radars, to use an adaptive temporal model to combine the signals received by a radar antenna. The techniques implemented in the field of radars is however not transposable as such to the field of FM radio reception.

The adaptive temporal model implemented in the world of radars is based on the implementation of an impulse response filter able to apply, to the vector of received complex signals, a complex weight vector that is written:

$$Wn = \begin{bmatrix} \exp(j2\pi F_d 0T) \\ \exp(j2\pi F_d 1T) \\ \vdots \\ \exp(j2\pi F_d (K-1)T) \end{bmatrix}$$

This model does not allow multi-path signals to be removed in the field of FM radio reception because each path followed by each of the time-shifted, received multi-path signals has, in the case of an FM radio signal, a specific gain that is dependent on the distance travelled by the radio wave, said distance not being a linear frequency-dependent function, contrary to the case of radar reception.

In addition, this model does not allow the spatial correlation that exists between signals received by an antenna array of a receiver to be taken into account.

Figure 1:
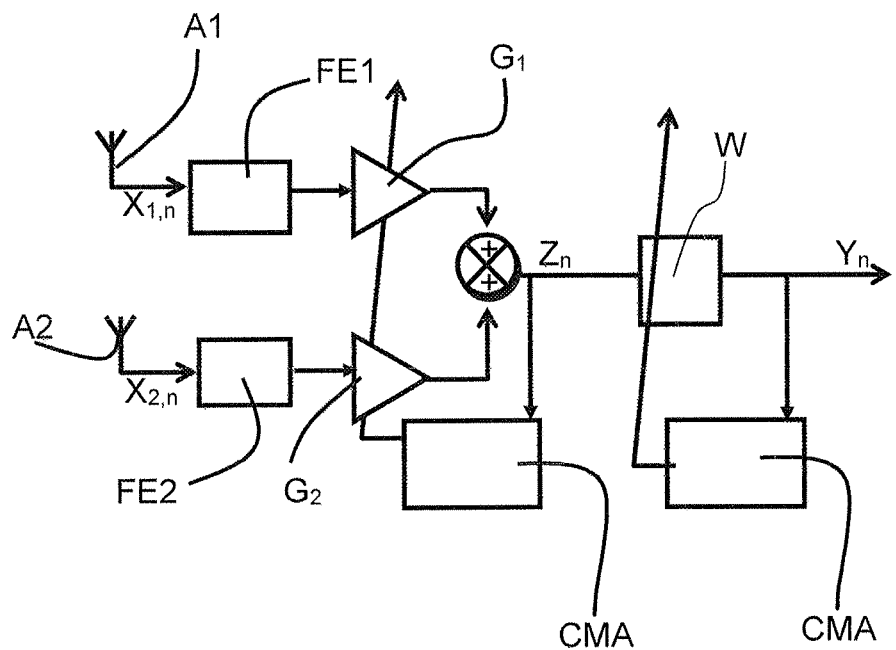
FIG. 1 shows the conceptual diagram of a method for cancelling out multi-path radio signals, according to the prior art.
Figure 2:
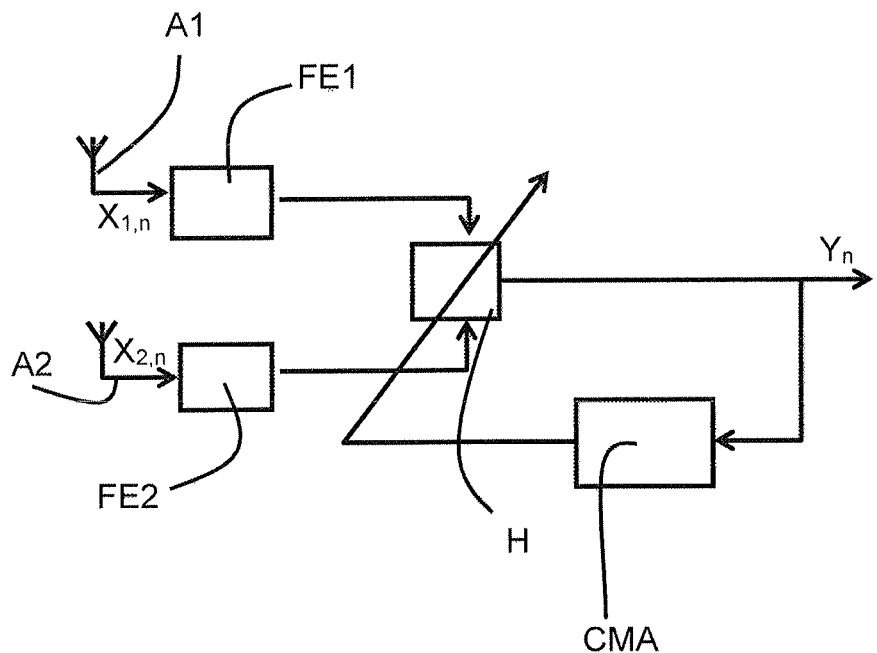
FIG. 2 shows the conceptual diagram of a method for cancelling out multi-path radio signals, according to an aspect of the invention.

With reference to FIG. 2, an aspect of the present invention proposes to simultaneously process the spatial filtering and the temporal filtering of the plurality of radio signals received by an antenna array comprising at least two antennas A1, A2. The antennas A1, A2 respectively receive a plurality of signals X1, X2 corresponding to one emitted FM radio signal. After acquisition via the input stages FE1, FE2, the received signals are filtered from the spatial and temporal standpoint by way of a dedicated stage H, the output of which is a recombined signal $Y_n$ that is intended to be played.

Thus, the filtered and recomposed signal after implementation of an iterative adaptation algorithm, in particular a CMA algorithm, is written:

$$y_n = (\overline{H})^T X = \begin{bmatrix} \overline{H}_1^T \\ \overline{H}_2^T \end{bmatrix} [X_1 \; X_2]$$

where $X_1 = [x_{1,n-K+1} \ldots x_{1,n}]$ and $X_2 = [x_{2,n-K+1} \ldots x_{2,n}]$ represent the last K signals received by the antennas A1, A2; $H_1$ and $H_2$ are matrices the complex components of which represent weights to be applied to said received signals in order to ensure the solution of the spatial and temporal diversity system.

To eliminate redundant parameters, the above equation may be rewritten so as to separate linear combinations from the spatial point of view and from the temporal point of view. Thus, by choosing to carry out the spatial filtering first, the following is obtained:

$$y_n = \overline{G_{1,n}^S}[(\overline{W_n^t})^T X_{1,n}] + \overline{G_{2,n}^S}[(\overline{W_n^t})^T X_{2,n}{}^t]$$

In other words, it will be clear from FIG. 2, given that the matrices $H_1$ and $H_2$ are made up of a spatial component and of a temporal component, that the recombined signal is written:

$$y_n = (\overline{W_n^t})^T [\overline{G_{1,n}^S} X_{1,n} + \overline{G_{2,n}^S} X_{2,n}]$$

where $W_n^t$ is the matrix which components have complex weights corresponding to the components of an impulse response filter to be implemented for the temporal filtering; $G_{1,n}^S$ and $G_{2,n}^S$ are the scalars the components of which are complex weights corresponding to the components of a filter to be implemented for the spatial filtering; $X_{1,n}$ and $X_{2,n}$ are complex vectors corresponding to the signals received by two antennas A1, A2; and "$T$" is the notation for the transpose of the matrix.

For a K-coefficient impulse response filter, at the time n, the complex matrix $W_n^t$ is written:

$$W_n^t = [w_{0,n} w_{1,n} w_{2,n} \ldots w_{K-1,n}]^T$$

with, in cartesian coordinates: $w_{k,n} = w_{k,n}^r + j\, w_{k,n}^i$

The complex scalars to be implemented for the spatial filtering are for their part written:

$$G_{1,n}^S = g_{1,n}^r + j\, g_{1,n}^i, G_{2,n}^S = g_{2,n}^r + j\, g_{2,n}^i$$

In the same way, the complex vectors corresponding to the signals received by the two antennas A1, A2 are respectively written:

$$X_{1,n} = \begin{bmatrix} x_{1,n} \\ x_{1,n-1} \\ x_{1,n-2} \\ \vdots \\ x_{1,n-K+1} \end{bmatrix}, X_{2,n} = \begin{bmatrix} x_{2,n} \\ x_{2,n-1} \\ x_{2,n-2} \\ \vdots \\ x_{2,n-K+1} \end{bmatrix}$$

The following expression for the recombined signal is obtained there from:

$$y_n = \sum_{k=0}^{K-1} \overline{w_{k,n}^r + Jw_{k,n}^i} \left( \overline{g_{1,n}^r + jg_{1,n}^i} x_{1,n-k} + \overline{g_{2,n}^r + jg_{2,n}^i} x_{2,n-k} \right)$$

An iterative adaptive algorithm, in particular a CMA algorithm, is then implemented to determine the complex components of $W_n^t$, $G_{1,n}^S$, $G_{2,n}^S$ allowing the following cost function to be minimized:

$$J_{CMA} = E\{(|y_n| - R)^2\}$$

It will be noted that, in the present description, only a CMA algorithm of (2, 1) type is envisioned, but any other type of adaptive algorithm, in particular any other type of CMA algorithm, could equally well be implemented.

The aforementioned cost function is minimized by means of the instantaneous gradient technique:

$$\nabla J_{CMA} = 2(|y_n| - R)\nabla |y_n|$$
$$= 2(|y_n| - R)\nabla (y_n \bar{y}_n)^{1/2}$$
$$= (|y_n| - R)\frac{1}{|y_n|}(y_n \nabla \bar{y}_n + \bar{y}_n \nabla y_n)$$

namely:

$$\nabla y_n = \begin{bmatrix} \frac{\partial y_n}{\partial W_n^t} \\ \frac{\partial y_n}{\partial G_{1,n}^s} \\ \frac{\partial y_n}{\partial G_{2,n}^s} \end{bmatrix} = \begin{bmatrix} \frac{\partial y_n}{\partial w_{0,n}} \\ \vdots \\ \frac{\partial y_n}{\partial w_{k,n}} \\ \vdots \\ \frac{\partial y_n}{\partial w_{K-1,n}} \\ \frac{\partial y_n}{\partial g_{1,n}^r} \\ \frac{\partial y_n}{\partial g_{1,n}^i} \\ \frac{\partial y_n}{\partial g_{2,n}^r} \\ \frac{\partial y_n}{\partial g_{2,n}^i} \end{bmatrix} = \begin{bmatrix} \vdots \\ \overline{G_{1,n}^s} x_{1,n-k} + \overline{G_{2,n}^s} x_{2,n-k} \\ -j(\overline{G_{1,n}^s} x_{1,n-k} + \overline{G_{2,n}^s} x_{2,n-k}) \\ \vdots \\ (\overline{W_n^t})^T X_{1,n} \\ -j(\overline{W_n^t})^T X_{1,n} \\ (\overline{W_n^t})^T X_{2,n} \\ -j(\overline{W_n^t})^T X_{2,n} \end{bmatrix} =$$

and $\nabla \overline{y_n} = \overline{\nabla y_n}$

The cost function is then written:

$$\nabla J_{CMA} = 2\frac{|y_n| - R}{|y_n|} \bar{y}_n \begin{bmatrix} \overline{G_{1,n}^s} X_{1,n} + \overline{G_{2,n}^s} X_{2,n} \\ (\overline{W_n^t})^T X_{1,n} \\ (\overline{W_n^t})^T X_{2,n} \end{bmatrix}$$

and the complex components for the spatial and temporal filtering of received signals are updated using the following equations:

$$\begin{cases} W_{n+1}^t = W_n^t - \mu_W \frac{|y_n| - R}{|y_n|} \overline{y_n} (\overline{G_{1,n}^s} X_{1,n} + \overline{G_{2,n}^s} X_{2,n}) \\ G_{1,n+1}^s = G_{1,n}^s - \mu_{G1} \frac{|y_n| - R}{|y_n|} \overline{y_n} (\overline{W_n^t})^T X_{1,n} \\ G_{2,n+1}^s = G_{2,n}^s - \mu_{G2} \frac{|y_n| - R}{|y_n|} \overline{y_n} (\overline{W_n^t})^T X_{2,n} \end{cases}$$

Thus, there is a correlation between the coefficients of the spatial filtering and those of the temporal filtering. Specifically, the update of the components of $G_{1,n}^S$, $G_{2,n}^S$ depend on $W_n^t$, and vice versa.

Thus, the implemented iterative adaptation algorithm, in particular the CMA algorithm, converges more rapidly and above all on more stable solutions.

According to one preferred embodiment, an even stronger correlation between the components of the scalars used for the spatial filtering and the components of the impulse response filter implemented for the temporal filtering may be introduced.

Starting with the equation issued from FIG. 2, according to which, it will be recalled:

$$y_n = (\overline{W_n^t})^T [\overline{G_{1,n}^S} X_{1,n} + \overline{G_{2,n}^S} X_{2,n}]$$

where $w_n^t$ is the matrix which components have complex weights corresponding to the components of an impulse response filter to be implemented for the temporal filtering; $G_{1,n}^S$ and $G_{2,n}^S$ are the scalars the components of which are complex weights corresponding to the components of a filter to be implemented for the spatial filtering; $X_{1,n}$ and $X_{2,n}$ are complex vectors corresponding to the signals received by two antennas A1, A2; and "$T$" is the notation for the transpose of the matrix.

As already indicated, for a K-coefficient impulse response filter, at the time n, the complex matrix $W_n^t$ is written:

$$W_n^t = [w_{0,n} w_{1,n} w_{2,n} \ldots w_{K-1,n}]^T.$$

In polar coordinates, $w_{k,n} = a_{k,n} e^{-j\theta_{k,n}}$.
Thus, $W_n^t = A_n^t \circ e^{-j\theta_n^t}$, with:

$$A_n^t = [a_{0,n} a_{1,n} a_{2,n} \ldots a_{K-1,n}]^T$$

$$\theta_n^t = [e^{-j\theta_{0,n}} e^{-j\theta_{1,n}} e^{-j\theta_{2,n}} \ldots e^{-j\theta_{K-1,n}}]^T$$

In the same way, the scalars $G_{1,n}^S$ and $G_{2,n}^S$ for their part also being complex, are able to be expressed in polar coordinates. Thus:

$$G_{1,n}^S = b_{1,n} e^{-j\varphi_{1,n}} \text{ and } G_{2,n}^S = b_{2,n} e^{-j\varphi_{2,n}}$$

It will be recalled that the complex vectors corresponding to the signals received by the two antennas A1, A2 are respectively written:

$$X_{1,n} = \begin{bmatrix} x_{1,n} \\ x_{1,n-1} \\ x_{1,n-2} \\ \vdots \\ x_{1,n-K+1} \end{bmatrix} \text{ and } X_{2,n} = \begin{bmatrix} x_{2,n} \\ x_{2,n-1} \\ x_{2,n-2} \\ \vdots \\ x_{2,n-K+1} \end{bmatrix}$$

The following expression for the recombined signal is obtained there from:

$$y_n = \sum_{k=0}^{K-1} a_{k,n} e^{-j\theta_{k,n}} (b_{1,n} e^{-j\varphi_{1,n}} x_{1,n-k} + b_{2,n} e^{-j\varphi_{2,n}} x_{2,n-k})$$

Thus, as in the preceding embodiment, an iterative adaptive algorithm, such as a CMA algorithm, is implemented to determine the complex components of $W_n^t$, $G_{1,n}^S$, $G_{2,n}^S$ allowing the following cost function to be minimized:

$$J_{CMA} = E\{(|y_n| - R)^2\}$$

It will again be noted that, in the present description, only a CMA algorithm of (2, 1) type is envisioned, but any other type of adaptive algorithm, in particular any other type of CMA algorithm, could equally well be implemented.

The aforementioned cost function is minimized by means of the instantaneous gradient technique:

$$\nabla J_{CMA} = 2(|y_n| - R) \nabla |y_n|$$
$$= 2(|y_n| - R) \nabla (y_n \overline{y_n})^{1/2}$$
$$= (|y_n| - R) \frac{1}{|y_n|} (y_n \nabla \overline{y_n} + \overline{y_n} \nabla y_n)$$

Namely, this time round:

$$\nabla y_n = \begin{bmatrix} \frac{\partial y_n}{\partial W_n^t} \\ \frac{\partial y_n}{\partial G_{1,n}^s} \\ \frac{\partial y_n}{\partial G_{2,n}^s} \end{bmatrix} =$$

$$\begin{bmatrix} \frac{\partial y_n}{\partial A_n^t} \\ \frac{\partial y_n}{\partial \theta_n^t} \\ \frac{\partial y_n}{\partial b_{1,n}} \\ \frac{\partial y_n}{\partial \varphi_{1,n}} \\ \frac{\partial y_n}{\partial b_{2,n}} \\ \frac{\partial y_n}{\partial \varphi_{2,n}} \end{bmatrix} = \begin{bmatrix} e^{-j\theta_{k,n}} (\overline{G_{1,n}^s} x_{1,n-k} + \overline{G_{1,n}^s} x_{2,n-k}) \\ \vdots \\ j \, a_{k,n} \, e^{-j\theta_{k,n}} (\overline{G_{1,n}^s} x_{1,n-k} + \overline{G_{2,n}^s} x_{2,n-k}) \\ \vdots \\ e^{-j\varphi_{1,n}} (\overline{W_n^t})^T X_{1,n} \\ j \, b_{1,n} \, e^{-j\varphi_{1,n}} (\overline{W_n^t})^T X_{1,n} \\ e^{-j\varphi_{2,n}} (\overline{W_n^t})^T X_{2,n} \\ j \, b_{2,n} \, e^{-j\varphi_{2,n}} (\overline{W_n^t})^T X_{2,n} \end{bmatrix} =$$

and $\nabla \overline{y_n} = \overline{\nabla y_n}$

Substitution of these terms in the cost function expressed above gives:

$$\nabla J_{CMA} = 2 \frac{|y_n| - R}{|y_n|} \begin{bmatrix} \text{Re}[\overline{y_n} \, e^{-j\theta_n^t} \circ (\overline{G_{1,n}^s} X_{1,n} + \overline{G_{2,n}^s} X_{2,n})] \\ -\text{Im}[\overline{y_n} \, A_n^t \circ e^{-j\theta_n^t} \circ (\overline{G_{1,n}^s} X_{1,n} + \overline{G_{2,n}^s} X_{2,n})] \\ \text{Re}[\overline{y_n} \, e^{-j\varphi_{1,n}} (\overline{W_n^t})^T X_{1,n}] \\ -\text{Im}[\overline{y_n} \, b_{1,n} \, e^{-j\varphi_{1,n}} (\overline{W_n^t})^T X_{1,n}] \\ \text{Re}[\overline{y_n} \, e^{-j\varphi_{2,n}} (\overline{W_n^t})^T X_{2,n}] \\ -\text{Im}[\overline{y_n} \, b_{2,n} \, e^{-j\varphi_{2,n}} (\overline{W_n^t})^T X_{2,n}] \end{bmatrix}$$

and the complex components for the spatial and temporal filtering of received signals are updated using the following equations:

$$\begin{cases} A_{n+1}^t = A_n^t - \mu_A \frac{|y_n|-R}{|y_n|} \text{Re}[\overline{y_n} \ e^{j\theta_n^t} \circ (\overline{G_{1,n}^s} X_{1,n} + \overline{G_{2,n}^s} X_{2,n})] \\ \theta_{n+1}^t = \theta_n^t + \mu_\theta \frac{|y_n|-R}{|y_n|} \text{Im}[\overline{y_n} \ A_n^t \circ e^{j\theta_n^t} \circ (\overline{G_{1,n}^s} X_{1,n} + \overline{G_{2,n}^s} X_{2,n})] \\ b_{1,n+1} = b_{1,n} - \mu_{b1} \frac{|y_n|-R}{|y_n|} \text{Re}[\overline{y_n} \ e^{j\varphi_{1,n}} (\overline{W_n^t})^T X_{1,n}] \\ \varphi_{1,n+1} = \varphi_{1,n} + \mu_{\varphi 1} \frac{|y_n|-R}{|y_n|} \text{Im}[\overline{y_n} \ b_{1,n} \ e^{j\varphi_{1,n}} (\overline{W_n^t})^T X_{1,n}] \\ b_{2,n+1} = b_{2,n} - \mu_{b2} \frac{|y_n|-R}{|y_n|} \text{Re}[\overline{y_n} \ e^{j\varphi_{2,n}} (\overline{W_n^t})^T X_{2,n}] \end{cases}$$

$$\varphi_{2,n+1} = \varphi_{2,n} + \mu_{\varphi 2} \frac{|y_n|-R}{|y_n|} \text{Im}[\overline{y_n} \ b_{2,n} \ e^{j\varphi_{2,n}} (\overline{W_n^t})^T X_{2,n}]$$

The strong interdependency between the real and imaginary parts of the complex weights to be determined will be evident from these formulae.

The implementation of iterative adaptation algorithms on these formulae, in particular CMA algorithms, with the constraint of minimizing the cost function described above, thus converges more efficiently than in the prior art. Specifically, the spatial and temporal correlations introduced above induce an interdependency in the update of the coefficients, decreasing the number of degrees of freedom, unlike CMA algorithms such as implemented in the prior art, with which the coefficients of the complex weights are independent linear cartesians.

By virtue of an aspect of the invention, the CMA algorithms converge to a smaller subset of solutions, said subset being included in the set of possible solutions of the CMA algorithms such as implemented in the prior art.

The implementation of the method according to an aspect of the invention therefore allows secondary signals produced by the multi-path effect to be removed with a better stability than in the prior art.

It will furthermore be noted that an aspect of the present invention is not limited to the embodiment described above, making recourse to CMA algorithms, and has variants that will appear obvious to those skilled in the art; in particular, other types of iterative algorithms may be implemented.

The invention claimed is:

1. A method for decreasing multi-path interference, for implementation thereof in a vehicle radio receiver, said radio receiver being intended to receive an emitted radio signal and comprising at least two radio reception antennas that each receive a plurality of radio signals corresponding to said emitted radio signal, each of said plurality of signals received by each of said antennas being composed of time-shifted radio signals resulting from a multi-path effect, said plurality of radio signals being combined to deliver a combined radio signal $y_n$ to be played, with $y_n = W_n^T[\overline{G_{1,n}^S} X_{1,n} + \overline{G_{2,n}^S} X_{2,n}]$ at the time n, where $X_1$ is a vector the components of which correspond to a plurality of signals received by a first antenna, expressed in complex baseband, $X_2$ is a vector the components of which correspond to the plurality of signals received by a second antenna, expressed in complex baseband, $G_{1,n}^S$ and $G_{2,n}^S$ are scalars the components of which are the complex weights of a spatial filter and $W_n^T$ is the transpose matrix of a vector the components of which are the complex weights of a temporal filter, said method comprising:

the implementation of an iterative adaption algorithm to determine said complex weights of the spatial filter and said complex weights of the temporal filter, wherein the respective variations in the components of the matrix the components of which form the complex weights of the temporal filter and in the components of the scalars the components of which form the complex weights of a spatial filter are written:

$$W_{n+1}^t = W_n^t - \mu_W \frac{|y_n|-R}{|y_n|} \overline{y_n} (\overline{G_{1,n}^s} X_{1,n} + \overline{G_{2,n}^s} X_{2,n})$$

$$G_{1,n+1}^s = G_{1,n}^s - \mu_{G1} \frac{|y_n|-R}{|y_n|} \overline{y_n} (\overline{W_n^t})^T X_{1,n}$$

$$G_{2,n+1}^s = G_{2,n}^s - \mu_{G2} \frac{|y_n|-R}{|y_n|} \overline{y_n} (\overline{W_n^t})^T X_{2,n}$$

where $\mu_W, \mu_{G1}, \mu_{G2}$ are iterative steps chosen for the update of the gains and phases of each of the complex weights.

2. The method as claimed in claim 1, wherein the iterative adaptation algorithm is configured to minimize a cost function J such that $$J = E\{(|y_n|-R)^2\}$$

where R is a constant to be determined, corresponding to the constant modulus of the combined signal $y_n$.

3. The method as claimed in claim 2, further comprising introducing a correlation between said complex weights of the temporal filter and said complex weights of the spatial filter, said correlation being dependent on the time shift between said plurality of radio signals received by said at least two antennas, by the expression of said complex weights in polar coordinates, so that the instantaneous gradient of the cost function is written:

$$\nabla J = 2 \frac{|y_n|-R}{|y_n|} \begin{bmatrix} \text{Re}[\overline{y_n} \ e^{j\theta_n^t} \circ (\overline{G_{1,n}^s} X_{1,n} + \overline{G_{2,n}^s} X_{2,n})] \\ -\text{Im}[\overline{y_n} \ A_n^t \circ e^{j\theta_n^t} \circ (\overline{G_{1,n}^s} X_{1,n} + \overline{G_{2,n}^s} X_{2,n})] \\ \text{Re}[\overline{y_n} \ e^{j\varphi_{1,n}} (\overline{W_n^t})^T X_{1,n}] \\ -\text{Im}[\overline{y_n} \ b_{1,n} \ e^{j\varphi_{1,n}} (\overline{W_n^t})^T X_{1,n}] \\ \text{Re}[\overline{y_n} \ e^{j\varphi_{2,n}} (\overline{W_n^t})^T X_{2,n}] \\ -\text{Im}[\overline{y_n} \ b_{2,n} \ e^{j\varphi_{2,n}} (\overline{W_n^t})^T X_{2,n}] \end{bmatrix}$$

with:

$W_n^t = A_n^t \circ e^{-j\theta_n^t}$, with:

$A_n^t = [a_{0,n} \ a_{1,n} \ a_{2,n} \ \ldots \ a_{K-1,n}]^T$ $\theta_n^t = [e^{-j\theta_{0,n}} \ e^{-j\theta_{1,n}} \ e^{-j\theta_{2,n}} \ \ldots \ e^{-j\theta_{K-1,n}}]^T$, and:

$G_{1,n}^s = b_{1,n} e^{-j\varphi_{1,n}}$ $G_{2,n}^s = b_{2,n} e^{-j\varphi_{2,n}}$ so as to incorporate an interdependence between the real and imaginary parts of said complex weights.

4. The method as claimed in claim 2, wherein said iterative adaptation algorithm is a constant modulus adaptation algorithm configured to minimize the cost function.

5. The method as claimed in claim 4, further comprising introducing a correlation between said complex weights of the temporal filter and said complex weights of the spatial filter, said correlation being dependent on the time shift between said plurality of radio signals received by said at least two antennas, by the expression of said complex weights in polar coordinates, so that the instantaneous gradient of the cost function is written:

$$\nabla J = 2\frac{|y_n|-R}{|y_n|}\begin{bmatrix} \operatorname{Re}[\overline{y_n}\ e^{j\theta_n^t}\circ(\overline{G_{1,n}^s}X_{1,n}+\overline{G_{2,n}^s}X_{2,n})] \\ -\operatorname{Im}[\overline{y_n}\ A_n^t\circ e^{j\theta_n^t}\circ(\overline{G_{1,n}^s}X_{1,n}+\overline{G_{2,n}^s}X_{2,n})] \\ \operatorname{Re}[\overline{y_n}\ e^{j\varphi_{1,n}}(\overline{W_n^t})^T X_{1,n}] \\ -\operatorname{Im}[\overline{y_n}\ b_{1,n}\ e^{j\varphi_{1,n}}(\overline{W_n^t})^T X_{1,n}] \\ \operatorname{Re}[\overline{y_n}\ e^{j\varphi_{2,n}}(\overline{W_n^t})^T X_{2,n}] \\ -\operatorname{Im}[\overline{y_n}\ b_{2,n}\ e^{j\varphi_{2,n}}(\overline{W_n^t})^T X_{2,n}] \end{bmatrix}$$

with:

$W_n^t = A_n^t \circ e^{-j\theta_n^t}$, with:

$A_n^t = [a_{0,n}\ a_{1,n}\ a_{2,n}\ \ldots\ a_{K-1,n}]^T$ $\theta_n^t = [e^{-j\theta_{0,n}}\ e^{-j\theta_{1,n}}\ e^{-j\theta_{2,n}}\ \ldots\ e^{-j\theta_{K-1,n}}]^T$, and:

$G_{1,n}^s = b_{1,n} e^{-j\varphi_{1,n}}$ $G_{2,n}^s = b_{2,n} e^{-j\varphi_{2,n}}$ so as to incorporate an interdependence between the real and imaginary parts of said complex weights.

6. The method as claimed in claim 1, further comprising introducing a correlation between said complex weights of the temporal filter and said complex weights of the spatial filter, said correlation being dependent on the time shift between said plurality of radio signals received by said at least two antennas, by the expression of said complex weights in polar coordinates, so that the instantaneous gradient of the cost function is written:

$$\nabla J = 2\frac{|y_n|-R}{|y_n|}\begin{bmatrix} \operatorname{Re}[\overline{y_n}\ e^{j\theta_n^t}\circ(\overline{G_{1,n}^s}X_{1,n}+\overline{G_{2,n}^s}X_{2,n})] \\ -\operatorname{Im}[\overline{y_n}\ A_n^t\circ e^{j\theta_n^t}\circ(\overline{G_{1,n}^s}X_{1,n}+\overline{G_{2,n}^s}X_{2,n})] \\ \operatorname{Re}[\overline{y_n}\ e^{j\varphi_{1,n}}(\overline{W_n^t})^T X_{1,n}] \\ -\operatorname{Im}[\overline{y_n}\ b_{1,n}\ e^{j\varphi_{1,n}}(\overline{W_n^t})^T X_{1,n}] \\ \operatorname{Re}[\overline{y_n}\ e^{j\varphi_{2,n}}(\overline{W_n^t})^T X_{2,n}] \\ -\operatorname{Im}[\overline{y_n}\ b_{2,n}\ e^{j\varphi_{2,n}}(\overline{W_n^t})^T X_{2,n}] \end{bmatrix}$$

with:

$W_n^t = A_n^t \circ e^{-j\theta_n^t}$, with:

-continued $A_n^t = [a_{0,n}\ a_{1,n}\ a_{2,n}\ \ldots\ a_{K-1,n}]^T$ $\theta_n^t = [e^{-j\theta_{0,n}}\ e^{-j\theta_{1,n}}\ e^{-j\theta_{2,n}}\ \ldots\ e^{-j\theta_{K-1,n}}]^T$, and:

$G_{1,n}^s = b_{1,n} e^{-j\varphi_{1,n}}$ $G_{2,n}^s = b_{2,n} e^{-j\varphi_{2,n}}$ so as to incorporate an interdependence between the real and imaginary parts of said complex weights.

7. The method as claimed in claim 6, wherein the respective variations in the components of the matrix the components of which form the complex weights of the temporal filter and in the components of the scalars the components of which form the complex weights of a spatial filter are written:

$$A_{n+1}^t = A_n^t - \mu_A \frac{|y_n|-R}{|y_n|}\operatorname{Re}[\overline{y_n}\ e^{j\theta_n^t}\circ(\overline{G_{1,n}^s}X_{1,n}+\overline{G_{2,n}^s}X_{2,n})]$$

$$\theta_{n+1}^t = \theta_n^t + \mu_\theta \frac{|y_n|-R}{|y_n|}\operatorname{Im}[\overline{y_n}\ A_n^t\circ e^{j\theta_n^t}\circ(\overline{G_{1,n}^s}X_{1,n}+\overline{G_{2,n}^s}X_{2,n})]$$

$$b_{1,n+1} = b_{1,n} - \mu_{b1} \frac{|y_n|-R}{|y_n|}\operatorname{Re}[\overline{y_n}\ e^{j\varphi_{1,n}}(\overline{W_n^t})^T X_{1,n}]$$

$$\varphi_{1,n+1} = \varphi_{1,n} + \mu_{\varphi 1} \frac{|y_n|-R}{|y_n|}\operatorname{Im}[\overline{y_n}\ b_{1,n}\ e^{j\varphi_{1,n}}(\overline{W_n^t})^T X_{1,n}]$$

$$b_{2,n+1} = b_{2,n} - \mu_{2,n} \frac{|y_n|-R}{|y_n|}\operatorname{Re}[\overline{y_n}\ e^{j\varphi_{2,n}}(\overline{W_n^t})^T X_{2,n}]$$

$$\varphi_{2,n+1} = \varphi_{2,n} + \mu_{\varphi 2} \frac{|y_n|-R}{|y_n|}\operatorname{Im}[\overline{y_n}\ b_{2,n}\ e^{j\varphi_{2,n}}(\overline{W_n^t})^T X_{2,n}]$$

where $\mu_A$, $\mu_\theta$, $\mu_{b1}$, $\mu_{b2}$, $\mu_{\varphi 1}$, $\mu_{\varphi 2}$ are iterative steps chosen for the update of the gains and phases of each of the complex weights, and the operator "∘" is defined as carrying out the multiplication of two vectors, component by component, the resultant being a vector.

8. The method as claimed in claim 1, wherein the temporal filter is an impulse response filter.

9. A radio receiver comprising a microcontroller configured to implement the method as claimed in claim 1.

10. A motor vehicle comprising a radio receiver as claimed in claim 9.

* * * * *